UNITED STATES PATENT OFFICE.

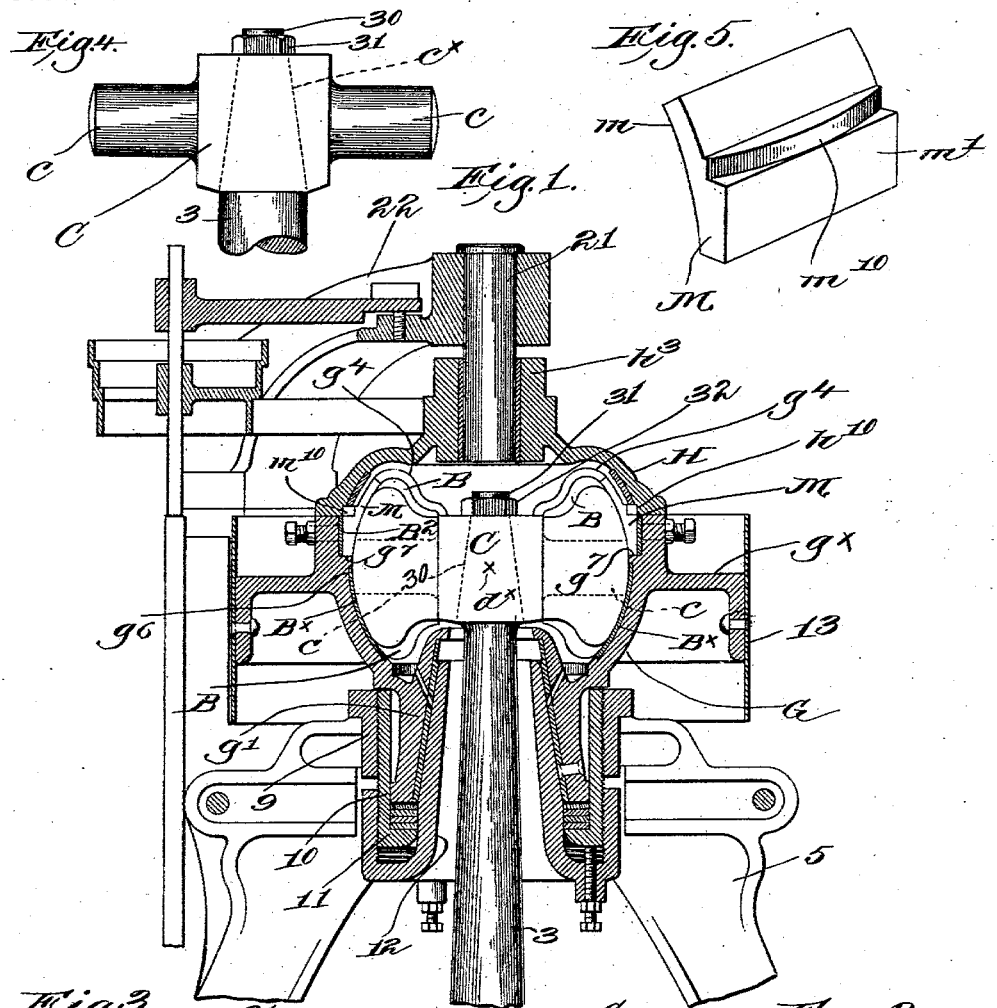

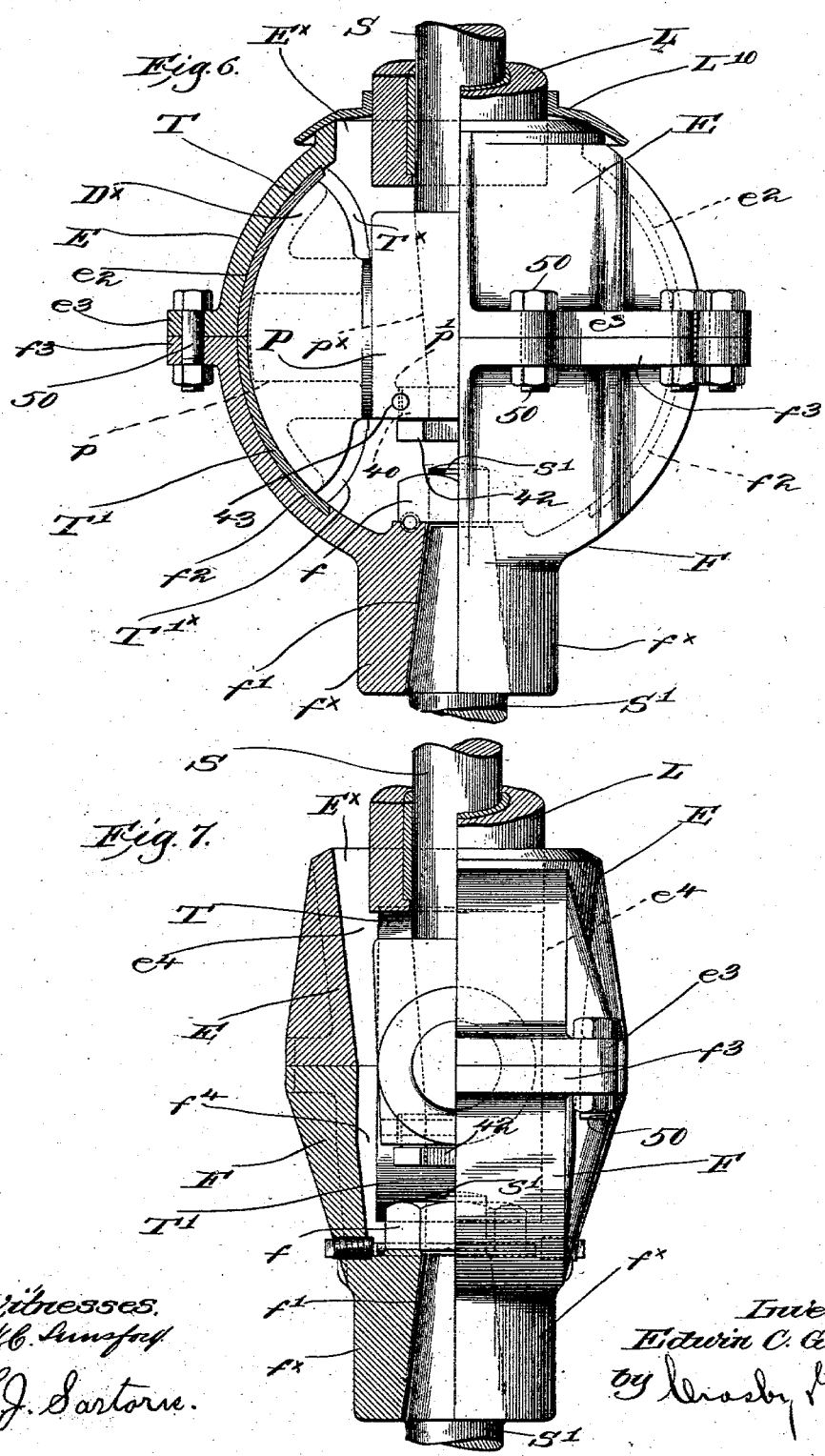

EDWIN C. GRIFFIN, OF NEWTON, MASSACHUSETTS.

SHAFT-COUPLING.

SPECIFICATION forming part of Letters Patent No. 721,035, dated February 17, 1903.

Application filed June 13, 1902. Serial No. 111,453. (No model.)

*To all whom it may concern:*

Be it known that I, EDWIN C. GRIFFIN, a subject of the King of Great Britain, residing at Newton, in the county of Middlesex and State of Massachusetts, have invented an Improvement in Shaft-Couplings, of which the following description, in connection with the accompanying drawings, is a specification, like characters on the drawings representing like parts.

This invention has for its object the production of a very strong and durable coupling device of simple construction and of such character that two rotating members can be thereby connected in such manner that one member may move into or out of alinement with the other member, so that the said members will be connected by a universal coupling. The practical applications of such a universal coupling are many, and I have herein shown two practical embodiments of my invention; but I desire it to be understood that my invention is not restricted to use with any particular apparatus.

In my present invention I have obviated expensive machinery necessary to produce the ball-and-socket type of universal coupling, while I secure the same flexibility or universality of movement of such couplings.

The various novel features of my invention will be hereinafter described, and particularly pointed out in the following claims.

Figure 1 is a vertical sectional view on the line $xx$, Fig. 2, of one practical embodiment of my present invention, illustrated in connection with a well-known form of grinding-mill. Fig. 2 is a plan view of a portion of the mechanism shown in Fig. 1, one-half of the cover portion of one member of the coupling being removed to show its interior construction. Fig. 3 is a perspective view, enlarged, of the segmental transmitting members and their connection with one shaft end. Fig. 4 is an enlarged side elevation of the cross-head shown in Figs. 1 and 3 with the trunnions thereon upon which the segmental members are pivotally mounted. Fig. 5 is a perspective view, also enlarged, of one of the retaining devices shown in Fig. 1. Fig. 6 is a half-section and side elevation of a modified form of coupling, to be described; and Fig. 7 is a half-edge view and section thereof.

Referring to Fig. 1, I have shown one embodiment of my invention applied to a grinding-mill of the general character shown in United States Patent No. 449,118, dated March 31, 1891, to which reference may be had for a detailed description of the general construction and arrangement. The frame 5, annular support 9 at the upper end thereof, the annular extension 10, connected with said support and having an inturned flange 11, and the hollow conical hub 12, connected by a screw-thread with the extension 10 to serve as a vertical support for the mechanism for driving the roll-shaft 3, may be and are substantially as in the patent referred to.

In the present invention the conical hub 12 serves as a journal or bearing upon which the driving-pulley 13 revolves.

The shaft section or end 3 is herein shown as tapered at 30 and threaded at 31, the tapered portion entering the correspondingly-tapered socket $c^\times$ in a cross-head C and being rigidly secured together by a retaining-nut 32, said cross-head having oppositely-extended arms or trunnions $c$, which are radial to the shaft.

The cross-head is preferably a steel forging, and it has pivotally mounted upon its trunnions like segmental transmitting members D of the coupling, said members being diametrically opposite each other and rotatable bodily with the shaft, while they are movable relatively thereto upon the radial axes or trunnions $c$, which latter are also radial to the convex faces $d$ of the transmitting members.

As best shown in Fig. 3, the convex faces $d$ are broad and the arcs are quite long, presenting an extended bearing-surface, the common center of the arcs being indicated at $d^\times$, Fig. 1.

The members D are inclosed within and have bearing-seats in a coöperating member of the coupling, shown in Figs. 1 and 2 as composed of two parts G H, the latter serving as a cap or cover and being detachably held in place by suitable bolts $h^\times$. The part G is shown as provided with an annular flange $g^\times$, to which the face 13 is secured, as by riveting, the parts G and H being preferably and conveniently steel castings, and the part G is shown in Fig. 1 as having at its lower end a conical hub $g'$ to rest upon and be rotatably supported by the cone 12. An upturned annular flange $g^2$ supports the cap H, having threaded holes $g^3$, Fig. 2, for the screw-bolts $h^\times$. The part G has two opposite pairs of internal upright cheeks $g^4$, the parallel inner faces of each pair being recessed at $g^5$ (see dotted lines, Fig. 2) to receive babbitt or other similar material B, Fig. 1, and the inner concave surface of the part G between the cheeks is also recessed, as at $g^6$, to receive babbitt, as $B^\times$.

Referring to Fig. 1, it will be seen that the concave bearings formed by the babbitt $B^\times$ are of the same curvature as the convex faces $d$ of the segmental members D and the distance between the parallel bearing-faces B is just sufficient to admit one of the members D therebetween, the opposite flat faces $d'$ of said members sliding upon the faces or bearings B. The said faces B and $B^\times$ together constitute a bearing-seat for one of the transmitting members D, and the latter swing or rock on the center $d^\times$ with the shaft 3, while the latter can swing in a plane at right angles thereto by the trunnions $c$, which easily fit holes $d^2$ in the segmental members. The flange $g^2$ is shouldered at $g^7$ between each pair of cheeks $g^4$ to support a retaining block or key M, Fig. 5, having a concave inner face $m$, which forms a continuation of the concave bearing $B^\times$ when the parts are assembled, as shown in Fig. 1, the upright outer plane face $m'$ being engaged by the ends of set-screws $m^\times$, which enter threaded holes $g^8$ in the flange $g^2$, check-nuts $m^2$ holding the set-screws in adjusted position.

When assembling the parts, the transmitting members D are first slipped onto the trunnions $c$, and the cross-head C and members D are inserted into the part G of the coupling member from the top, said members entering the bearing-seats provided therefor. The shaft 3 is then inserted in the cross-head and secured thereto by the nut 32, after which the keys M are inserted, one between each pair of cheeks and resting on the shoulders $g^7$, completing the concave bearings for the transmitting members D. I prefer after setting up the screws $m^\times$ to pour babbitt in between the backs $m'$ of the keys and the adjacent parallel faces $g^9$ of the flange $g^2$, as at $B^2$, Fig. 1, to make a solid backing for the keys, and thereafter the cover or top part H is applied and bolted to the part G, and as said cover is provided with an internal annular shoulder $h^{10}$ to fit over a similar lip $g^{10}$ on the flange $g^2$ the keys M each have a segmental portion $m^{10}$ of like curvature to fit in between the cheeks and form a continuation of the lip $g^{10}$, which is interrupted at the cheeks.

Rotation is imparted to the coupling member G H in any suitable manner and in the application of my invention shown in Fig. 1 by means of a belt coöperating with the pulley 13. The cover H is therein shown as having at its top a hub $h^3$, which rotates on a stud or journal 21, mounted in an upturned arm 22, forming a part of the mill-frame, and obviously the hub $h^3$ could, if desired, be secured to a driving-shaft end in place of the journal 21 to thereby rotate the coupling member G H. Said member incloses the movable parts of the coupling, protecting the same from the entrance of dust and dirt.

Referring to Fig. 1, it will be seen that the areas of the bearing-faces B are sufficiently larger than the contacting faces $d'$ of the members D to admit of the sliding or rocking movement of the latter upon the babbitt. By this convenient and ready method of providing bearing-faces the different parts of the coupling can be made as castings, and extensive machining is thereby obviated, the cost of the device being thus very materially decreased.

The Babbitt or similar metal can be readily poured into the pockets designed therefor by the use of a temporary core in a manner well known to mechanics.

In the construction described the locking members or keys M are necessary, because of the fact that the plane of separation between the parts G and H is above the diametral line between the opposite faces $B^\times$ and passing through the center $d^\times$, the shoulders $g^7$ being in such line in order that the parts of the coupling may be assembled, as described.

In the modified form of coupling shown in Figs. 6 and 7 the construction of the cross-head P, having the trunnions $p$ and the segmental transmitting member $D^\times$ pivotally mounted thereon, is substantially as has been described, the cross-head having a tapered hole $p^\times$ to receive the correspondingly-tapered end of one shaft end or section S. The end of the hole $p^\times$ is preferably counterbored, as at $p'$, to receive the threaded shank 40 of the retaining-nut 42, and when the latter is fully set up a locking-pin is driven through a transverse hole 43 in the cross-head and engaging the shank. The segmental members $D^\times$ rotate bodily with the shaft end or section S and are movable relatively thereto on the radial axes provided by the trunnions $p$.

In the modification the coöperating and inclosing member of the coupling is also shown in two parts E F, the latter having a hub $f^\times$ to receive and be secured to the shaft end or section S', the latter being shown as tapered to enter the tapering bore $f'$ of the hub, a holding-nut $f$ being screwed onto the threaded extremity $s'$ of the shaft-section S'. This part has two internal opposite concave pockets $f^3$ of the same curvature as the convex faces of the members $D^\times$, and the part E has two like pockets $e^2$, which register with the former when the parts E and F are connected by bolts 50, extended through external flanges $e^3$ $f^3$ on the said parts, and the pockets are filled with babbitt, as at T T', Fig. 6, to provide concave seats or bearings for the segmental members $D^\times$. On each side of the seats each part is formed to present cheeks $e^4$ $f^4$ to receive between them the segmental members, and these cheeks are preferably provided with suitable pockets to receive Babbitt metal, as at $T^x$ $T'^x$, Fig. 6. A large opening $E^x$ is made in the part E opposite the hub $f^x$ of the other part to receive the shaft-end or section S and permit the relative play of the sections S and S', permitted by the coupling. If the former section is rotatable in fixed bearings, one bearing, as L, may extend in the opening $E^x$, as shown, and an annular closure or cover plate $L^{10}$ may be secured to said bearing and extend over the adjacent end of the part E to prevent the entrance of dust or dirt into the coupling, as in Fig. 6. Inasmuch as the plane of separation of the parts E and F coincides with the diametral line from one to the other of the concave bearing-seats at right angles to and intersecting the longitudinal axis of the shaft-section S' it will be manifest that no additional locking members or keys are necessary in this construction.

It is immaterial whether the segmental members are mounted on the shaft-section which rotates in fixed bearings or on the adjacent shaft-section, so far as the operation of the coupling is concerned, as the inclosing member thereof may rock or slide upon the segmental members, or vice versa. So, too, it is immaterial which member of the coupling is mounted on the shaft or other device which drives or which is to be driven, the rotation imparted to one member of the coupling being imparted to the other by or through the lateral engagement of the segmental members and the coöperating cheeks of their bearing-seats.

Various changes or modifications may be made by those skilled in the art without departing from the spirit and scope of my invention herein shown and described.

Having described my invention, what I claim as new, and desire to secure by Letters Patent, is—

1. A rotatable member, oppositely-located segments mounted upon and to rotate bodily therewith and movable relatively thereto on axes radial to said member, and a coöperating, bodily-rotatable inclosing member having concave bearings for and concentric with the convex faces of the segments, and opposite, parallel bearing-faces to coöperate with the sides of the segments and effect rotation of said coupled members in unison.

2. A rotatable shaft, oppositely-located segments mounted upon and to rotate bodily therewith and movable relatively thereto on axes radial to the shaft, and a coöperating, bodily-rotatable inclosing member having bearings for and concentric with the convex faces of the segments, and means to prevent axial movement of the segments relatively to said inclosing member, whereby the latter and the shaft are universally coupled together to rotate in unison.

3. In a universal coupling, a rotatable member having opposite concave bearings radially disposed with relation to its axis of rotation, oppositely-located segments coöperating with said bearings and bodily movable thereupon, a second rotatable member upon which said segments are mounted to rotate bodily therewith and movable relatively thereto on axes radial to its longitudinal axis, and means to prevent relative rotative movement of the said two rotatable members.

4. A universal coupling for adjacent rotatable shafts, comprising oppositely-located segments mounted upon and to rotate bodily with one shaft and movable relatively thereto on axes radial to the shaft, and a coöperating inclosing member mounted on the adjacent shaft, and having opposite, radially-disposed bearing-seats provided with concave ends concentric with the convex faces of the segments, to effect simultaneous rotation of the shafts while permitting one to move out of alinement with the other.

5. A universal coupling for rotatable shafts, comprising a member mounted on one shaft end and having opposite concave bearings radially disposed with relation to the shaft, the said member having an opening for the reception of the adjacent shaft end, oppositely-mounted segments on the latter shaft bodily rotatable therewith and movable relatively thereto on axes radial to said shaft, the segments being inclosed within said member and coöperating with the concave bearings therein, and means on said member to transmit rotative movement of one shaft to the other by or through lateral pressure on the segments.

6. A rotatable driving member, an adjacent shaft to be driven, and a coupling between them, comprising segmental transmitting members mounted upon and to rotate bodily with the shaft and movable relatively thereto on axes radial thereto, and a box-like member mounted to rotate with said driving member and having an opening to freely receive the adjacent shaft end, said box-like member having opposite, radially-disposed bearing-seats to engage and coöperate with the convex and opposite, parallel sides of the segmental transmitting members.

7. A driving-shaft, a shaft to be driven, and a universal coupling therebetween, said coupling comprising a two-part member having two opposite, internal concave bearings radially disposed relative to its axis of rotation, means to detachably connect the parts of said member, one of said parts being mounted on and to rotate with one shaft, and the other part having an opening opposite thereto, segmental transmitting members coöperating with said bearings and bodily movable thereupon, said members being mounted upon and to rotate bodily with the other adjacent shaft, extended through the opening in the two-part member, the segmental members being movable relatively to the shaft on axes radial thereto, and means on the two-part member to coöperate with the sides of the segmental members and thereby transmit rotative movement of one shaft to the other while permitting the one to be in non-alinement with the other.

8. In a universal coupling, opposite, radial trunnions adapted to be secured to a rotatable member, segments pivotally mounted thereon, the trunnions being radial to the convex faces of the segments, and a rotatable cooperating member inclosing the latter, said inclosing member having oppositely-located internal concave bearings for the segments, and plane faces to cooperate with the sides thereof.

9. A driving-shaft, a shaft to be driven, and a universal coupling therebetween, comprising oppositely-extended trunnions rigidly attached to one shaft, transmitting-segments pivotally mounted on said trunnions, and a bearing member for the segments, rigidly secured to the other shaft, said member having seats to cooperate with the segments, each seat having radially-disposed parallel, plane faces and a concave face, to cooperate respectively with the sides and convex portion of each segment.

10. In a shaft-coupling, a head having oppositely-extended trunnions and adapted to receive and be secured to one shaft end, two like segmental transmitting members pivotally mounted on the trunnions, the center of the convex faces thereof lying in the axis of the shaft, a bearing member adapted to be secured to an adjacent shaft end and having opposite concave bearings the common center whereof coincides with the center of the segmental members, and lateral bearings to cooperate with the sides of the latter, whereby rotation of one shaft is transmitted to the other.

11. In a shaft-coupling, two segmental transmitting members oppositely mounted upon and to rotate bodily with one shaft end and movable relatively thereto on axes radial to the latter, a bearing member rotatable with the adjacent shaft end and having internal bearing-seats to cooperate with the sides and convex faces of the segmental members, and means to retain the latter within the bearing member in cooperative relation with the bearing-seats.

12. A universal coupling for adjacent rotatable shafts, comprising oppositely-located segments mounted upon and to rotate bodily with one shaft and movable relatively thereto on axes radial to the shaft, and a cooperating inclosing member mounted on the adjacent shaft, and having opposite, radially-disposed bearing-seats provided with the recessed concave ends concentric with the convex faces of the segments, and a wear-surface of babbitt or the like in each recess, for the segments, simultaneous rotation of the shafts being effected by the coupling while permitting one to move out of alinement with the other.

13. In a universal coupling, a member having trunnions on opposite sides, a transmitting member on each trunnion, with outside, circular segmental bearing-surfaces and plane bearing sides, and an inclosing or containing part having opposite pockets with bearing-surfaces fitting and conforming to the bearing-surfaces of the transmitting members.

In testimony whereof I have signed my name to this specification in the presence of two subscribing witnesses.

EDWIN C. GRIFFIN.

Witnesses:
JOHN C. EDWARDS,
EDITH M. STODDARD.